United States Patent Office 2,964,503
Patented Dec. 13, 1960

2,964,503

POLYSULFIDE COMPOSITIONS AND CURE

Gordon D. Carpenter, Sylmar, George Gregory, Encino, Sarkis H. Kalfayan, North Hollywood, and Irvin P. Seegman, Sherman Oaks, Calif., assignors to Products Research Company, Los Angeles, Calif., a corporation of California No Drawing. Filed Mar. 29, 1957, Ser. No. 649,278

7 Claims. (Cl. 260—79.1)

This invention relates to polysulfide synthetic rubber and polysulfide polymers. It relates specifically to a process for producing a vulcanized or "cured" polysulfide rubber body, matrix, or film of enhanced properties, to materials for use therein, and novel methods of insuring the cure of such body or film for the attainment of optimum physical and chemical properties. This invention is a continuation-in-part of the invention disclosed in copending application Serial No. 520,927, now Patent No. 2,787,608, filed July 8, 1955.

As is pointed out in our copending application, the "polyalkylene polysulfide" polymers may exist in a solvent-free, flowable liquid polymer form that may be vulcanized even at room temperatures to a cured rubbery elastomer. The polymers in liquid form sometimes termed "polyfunctional liquid mercaptans" or merely "polysulfide liquid polymers," are useful in a wide variety of applications, owing to the ease of handling the liquid material, and particularly as the cured elastomers have the physical characteristics of the polysulfide polymers.

The liquid polymers can be used with the soluble curing agents of our copending application in a number of ways, for example, in the impregnation of leather, fabrics and wood. The polymers can be compounded on a paint mill, in a ball mill, or in an internal mixer with fillers and reinforcing pigments and various modifying resinous or plastic compositions. In the compounded form they can be used as adhesives, casting compounds, coatings and sealers. As illustrations, they have been very successfully used as sealants between metal surfaces, in the pressurization of aircraft, as sealants in air and gas ducts, as protective linings in gasoline reservoirs and containers, as adhesives, and in many other useful applications.

When cured in the particular manner described in our Patent No. 2,787,608 (employing as a curing component a soluble salt of chromic acid), cured elastomers may be produced having enhanced physical and chemical properties, e.g.: excellent resistance to a wide range of solvents, oils and fuels; a desirable resiliency; a service temperature range of from about −70° F. to 350° F.; excellent ozone and oxidation resistance; and good electrical properties and adherence to metal at ordinary temperatures. Notwithstanding these desired characteristics and the demonstrated usefulness of the liquid polyalkylene polysulfides cured in the above manner, the cured elastomers are nevertheless subject to certain short comings:

(1) Their resistance to swelling and loss of physical properties after emersion in water at elevated temperatures is limited and exists only for relatively short periods of time: yet such conditions of moisture and temperature are commonly encountered, particularly as water is a by-product of cure.

(2) Vaporization of moisture occluded or otherwise contained within the cured or uncured polymer compositions is not easily controlled, and may produce a number of undesired side effects. For example, at temperatures on the order of 300° F., "interfacial sponging" may occur at a bonding interface causing the cured material to lift off the surface to which it is bonded. When a cured body is completely contained, exposure to elevated temperatures may cause undue expansion or undesired "forced thermal extrusion" of the material.

Although the cured elastomers possess enhanced resistance to high temperatures, their electrical insulation properties become impaired at temperatures above about 185° F.

The present invention discloses a method of imparting enhanced moisture resistance to cured polyalkylene polysulfide compositions, at elevated temperatures, and virtually eliminates the problems arising from the vaporization of contained water at such temperatures. The present invention also discloses improvements in the cure of liquid polyalkylene polysulfides whereby formed objects possessing improved electrical characteristics over a wide temperature range may be produced. The present invention also provides a method of curing such compositions by which the rate of cure may be controlled to provide modified physical and chemical characteristics and by which substantially shorter periods of cure can be had than has heretofore been possible, without any appreciable shortening of work life.

It has been determined that the presence, with a curing component comprising a soluble salt of chromic acid, of a solubilizing agent from the group of amides, sulfoxides, sulfones, sulfonamides, phosphoramides, esters of phosphoric acid, esters of boric acid and esters of mono- or polybasic organic acids, not only modifies the rate of cure of polyalkylene polysulfide polymers but also uniquely modifies the properties of the cured composition. The present invention utilizes this phenomenon and discloses a method whereby a desired complete cure of polyalkylene polysulfide polymers may unexpectedly be accomplished at a much faster rate, such completely cured polymer possessing enhanced resistance to swelling and to loss of physical properties in the presence of water and at elevated temperatures, and correspondingly greater resistance to thermal extrusion and interfacial sponging. The invention also pertains to methods of providing cured elastomers from liquid polyalkylene polysulfide polymers that possess improved characteristics as electrical insulators.

It is an object of the present invention therefore to disclose and provide a solubilizing agent for use in the cure of polyalkylene polysulfide compositions and capable of controlling the rate of cure and modifying the characteristics of the cured composition.

Another object of the invention is to provide a method of producing polyalkylene polysulfide compositions adapted for use in the production of formed objects having enhanced characteristics with respect to water resistance at elevated temperatures.

A further object of the invention is to disclose and provide cured objects from liquid polyalkylene polysulfide polymers, such objects being characterized by enhanced resistance to thermal extrusion and interfacial sponging, and improved electrical characteristics over a wide range of temperatures.

Other objects and advantages will become apparent to those skilled in the art from the following description and examples.

The present invention is applicable for use with all polyalkylene polysulfide polymers of the types more specifically described in copending application Serial No. 520,927 (now Patent 2,787,608) and particularly the liquid polymers cured or vulcanized by means of the soluble salts of chromic acid as therein disclosed. It is to be understood, therefore, that the polymers and curing components contemplated herein embrace all the variations described in our aforementioned copending application.

Generally stated the present invention is based on the concept that control over the rate of cure and a modification of the characteristics of the cured composition may be achieved by incorporating into a curing composition, composed essentially of a base mixture of polyalkylene polysulfide polymers and a soluble curing agent adapted to liberate anions of chromium when in solution, between about 2 and 50 parts of a modifying and solubilizing agent from the group of amides, sulfoxides, sulfones, sulfonamides, phosphoramides, esters of phosphoric acid, esters of boric acid, and esters of monobasic and polybasic organic acids per each 100 parts of polyalkylene polysulfide polymer. Desirably the modifying and solubilizing agent should be in liquid form, having a melting point below about 20° C. and a boiling point above about 125° C., and should be stable to oxidation in the presence of the curing component. Moreover, such agent should be at least a partial solvent for the curing salt.

Among the solubilizing and modifying agents found to produce the unexpected properties hereinabove noted (as well as other advantages), members of the class of N,N-dialkylformamides and N,N-dialkylacetamides are to be preferred, primarily because of their ready availability and comparatively low cost. Representative of these preferred materials are N,N-dimethylformamide, N,N-diethylformamide, N,N-dimethylacetamide and N,N-diethylacetamide. It will be understood, however, that all members of the above-identified broad group of agents, having the specified properties, may be successfully used in carrying out the methods of the invention. Thus, amides, such as N,N-diphenylformamide or N,N-diphenylbenzamide, sulfoxides, such as dimethylsulfoxide or diphenylsulfoxide, sulfones, such as dimethylsulfone or diphenylsulfone, sulfonamides, such as N-ethyltoluene sulfonamide, phosphoramides, such as hexamethyl phosphoramide, esters of phosphoric acid, such as tributoxyethylphosphate or trichloroethylphosphate, esters of boric acid, such as tri-(2,6,8-trimethyl-4-nonyl) borate, esters of monobasic organic acids, such as butyl benzoate, or esters of polybasic organic acids, such as methylphthalylethylglycollate may all be successfully employed.

The solubilizing and modifying agents of the invention may be incorporated into the polymers within the limits above specified as a separate liquid or in the form of a solution containing the curing component dissolved therein. More specifically, such organic solubilizing and modifying agents may be incorporated as an integral part of the base mixture polyalkylene polysulfide polymer and the desired curing component incorporated just prior to cure, or the curing component may be initially incorporated into the base mixture and the liquid organic agent added at the time of cure. Alternatively, a curing solution composed of the curing component dissolved in the liquid organic agent might be separately prepared, such solution being added to effect the cure. In the event the base mixture is to contain fillers or additives, such fillers or additives may be blended into the liquid polymer on a suitable mill such as a roller mill or paint mill and the curing component and modifying agent of the invention thereafter incorporated into the mixture in any of the ways just described.

The novel method and desirable results of the present invention are preferably obtained by use of curing components conforming to the many necessary requirements set forth in Patent No. 2,787,608. These curing components, comprising broadly the soluble salts of chromic acid which upon solution liberate anions containing chromium, not only effect a cure at normal atmospheric temperatures, without need of outside air, but also produce in the cured elastomers enhanced properties of resistance to high temperature, compression set, and to the solvent action of hydrocarbons. Specifically, the curing agents herein contemplated, having demonstrated compatibility and usefulness with the solubilizing and modifying agents of the present invention, include a large number of soluble chromates, bichromates and trichromates. Among the soluble chromates, for example, are ammonium chromate, lithium chromate, sodium chromate, potassium chromate, potassium chloro chromate, rubidium chromate, cesium chromate, magnesium chromate and calcium chromate. Organic chromates include tertiary butyl chromate and guanidine chromate. Among the bichromates, are ammonium bichromate, lithium bichromate, sodium bichromate, potassium bichromate, rubidium bichromate, cesium bichromate, magnesium bichromate, calcium bichromate, strontium bichromate, zinc bichromate, cadmium bichromate, copper bichromate, ferric bichromate, cobalt bichromate and nickel bichromate. Organic bichromates include tertiary butyl bichromate and guanidine bichromate. Trichromates found useful as curing components include: sodium trichromate, potassium trichromate, and strontium trichromate.

The improved results obtained through use of the methods disclosed herein, which can only result from use of the novel solubilizing and modifying agents of the invention, are typified by the data set forth in Table I, which serves to illustrate the invention and to make clear the manner in which it may be practiced. In each of batches A, B, C, D, E and F, the same liquid polyalkylene polysulfide polymer was employed, such polymer having an average molecular weight of about 5,000 and a viscosity on the order of 35,000 to 45,000 centipoises. The compounding of each batch of the liquid polymer (which can be derived from dichlorodiethylformal and trichloroethane or trichloropropane reacted with a metallic disulfide) was substantially the same, as indicated in the table, and the batches tested under identical, approved conditions. Batch A was used as a check and employs a curing system comprising sodium bichromate and water as an activator. Batches B, C, D, E and F similarly employ soluble chromates as the curing component but employ as activators various organic solubilizing and modifying agents, in accordance with the present invention.

*Table I*

|  | (A) | (B) | (C) | (D) | (E) | (F) |
| --- | --- | --- | --- | --- | --- | --- |
| Formulation, parts by weight: Base Mix— |  |  |  |  |  |  |
| Polyaklylene polysulfide polymer | 100 | 100 | 100 | 100 | 100 | 100 |
| Fillers (Titanium dioxide, Calcium carbonate, Calcium oxide, Ferric oxide) | 50 | 50 | 50 | 50 | 50 | 50 |
| Wetting Agent (Stearic acid, polyethylene glycol thioether) | 1 | 1 | 1 | 1 | 1 | 1 |
| Adhesive Resin (Phenolic, epoxy resins) | 5 | 5 | 5 | 5 | 5 | 5 |

Table 1—Continued

| | (A) | (B) | (C) | (D) | (E) | (F) |
|---|---|---|---|---|---|---|
| Formulation, parts by weight: *Continued*. | | | | | | |
| Curing Component— | | | | | | |
| Sodium bichromate | 7 | | | | | |
| Calcium bichromate | | 7 | | | | 3.5 |
| Magnesium bichromate | | | 7 | | | 3.5 |
| Strontium bichromate | | | | 7 | | |
| Cobalt bichromate | | | | | 7 | |
| Solubilizing Agent— | | | | | | |
| Water | 7 | | | | | |
| Diethylformamide | | 7 | | | | |
| Tributoxyethylphosphate | | | 7 | | | |
| Dimethylsolfoxide | | | | 7 | | |
| N-ethyltoluenesulfonamide | | | | | 7 | |
| Dimethylacetamide | | | | | | 7 |
| Test and Method: | | | | | | |
| Minimum application life in hours | 3 | 3 | 3 | 3 | 3 | 3 |
| Ultimate cure time in days | 30 | 14 | 14 | 14 | 14 | 14 |
| Thermal softening as indicated by Shore hardness— | | | | | | |
| Initial at 75° C | 55 | 57 | 50 | 50 | 53 | 55 |
| At 325° F. for 5 min | 40 | 48 | 38 | 40 | 42 | 45 |
| Interfacial sponging— | | | | | | |
| At 225° F | None | None | None | None | None | None |
| At 275° F | Moderate | do | do | do | do | do |
| At 325° F | Considerable. | do | do | do | do | do |
| Swelling on emersion in water, percent (14 days at 140° F.) | 30 | 3 | 5 | 2 | 4 | 4 |
| Compression Set, percent (24 hours at 10 p.s.i. and 120° F.) | 4 | 3 | 6 | 4 | 6 | 3 |
| Resistance to hydrocarbons, percent loss (7 days at140° F. in 30 percent aromatics) | 4.6 | 6.0 | 2.6 | 2.0 | 7.8 | 4.0 |
| Electrical insulation characteristics (Volume resistivity in ohm-cms.)— | | | | | | |
| Initial at 75° F | $3 \times 10^{10}$ | $3 \times 10^{10}$ | $5 \times 10^{12}$ | $3 \times 10^9$ | $2 \times 10^{11}$ | $1 \times 10^{10}$ |
| At 300° F | $4 \times 10^6$ | $4 \times 10^8$ | $6 \times 10^9$ | $1 \times 10^7$ | $2 \times 10^9$ | $2 \times 10^8$ |
| At 75° F. after 14 days at 165° F. and 100% Relative humidity | $<1 \times 10^5$ | $4 \times 10^8$ | $5 \times 10^9$ | $1 \times 10^7$ | $9 \times 10^8$ | $2 \times 10^9$ |
| Adhesion, pounds per inch | 30 | 50 | 32 | 44 | 28 | 49 |

Attention is called to the fact that the enhanced physical properties made possible by the invention disclosed in Patent No. 2,787,608 (specifically, improved compression set and adhesion to metals and resistance to hydrocarbons and thermal softening) were in no way impaired by the practice of the present invention. On the other hand, substantial improvements were observed in the resistance of interfacial sponging ("none" when employing the solubilizers of the present invention as compared to "moderate" or "considerable" when employing water). Moreover, the rate of cure, as indicated by ultimate cure time, was cut approximately in half (from 30 days to 14 days). Particularly significant is the fact that virtually no swelling in water occurred, even after a relatively prolonged period of 14 days, at water temperatures as high as 140° F. These results especially demonstrate the unexpected utility of the methods and compositions of the present invention.

To those skilled in the art to which this invention relates, widely differing procedures, embodiments and applications of the invention will suggest themselves without departing from the spirit and scope of the invention. The disclosures and the description herein are purely illustrative and are not intended to be in any sense limiting.

We claim:

1. A method of producing a high heat and hydrocarbon resistant type of cured elastomer, said elastomer being particularly characterized by enhanced electrical properties, a low water sensitivity at elevated temperatures, and resistance to thermal extrusion, comprising controlling the rate of cure and modifying the characteristics of the cured elastomer by incorporating into a composition composed essentially of polyalkylene polysulfide liquid polymers and a curing component comprising a soluble salt of chromic acid adapted to liberate anions of chromium when in solution, between about 2 and 50 parts of a normally liquid, solubilizing and modifying agent from the group consisting of amides, sulfoxides, sulfones, sulfonamides, phosphoramides, esters of phosphoric acid, esters of boric acid, and esters of monobasic and polybasic organic acids per each one hundred parts of polyalkylene polysulfide polymers, said agent having a melting point below about 20° C., a boiling point above about 125° C., being at least a partial solvent for said curing component and being stable to oxidation in the presence of said component.

2. An improved, high heat- and hydrocarbon-resistant polyalkylene polysulfide composition adapted to cure to an elastomer, said elastomer being particularly characterized by enhanced electrical properties, a low water-sensitivity at elevated temperatures and resistance to thermal extrusion, said composition being composed essentially of a mixture of liquid polyalkylene polysulfide polymers curable to a synthetic rubber and a curing component adapted to liberate anions of chromium when in solution, and containing between about 2 to 50 parts of a normally liquid agent from the group consisting of amides, sulfoxides, sulfones, sulfonamides, phosphoramides, esters of phosphoric acid, esters of boric acid, and esters of monobasic and polybasic organic acids per each one hundred parts of polyalkylene polysulfide polymers, said agent having a melting point below about 20° C., a boiling point above about 125° C., being at least a partial solvent for said curing component and being stable to oxidation in the presence of said component.

3. A method as stated in claim 1 wherein the polyalkylene polysulfide liquid polymers have a molecular weight of between about 2,000 and 8,000.

4. A method as stated in claim 1 wherein the polyalkylene polysulfide polymers have a molecular weight of between about 2,000 and 8,000 and the soluble salt is a bichromate.

5. The composition as stated in claim 2 wherein the liquid agent is N,N-dialkylformamide.

6. The composition as stated in claim 2 wherein the liquid agent is N,N-dialkylacetamide.

7. The composition as stated in claim 2 wherein the liquid agent is a dialkylsulfoxide.

References Cited in the file of this patent

UNITED STATES PATENTS 2,787,608   Gregory et al. _____ Apr. 2, 1957